(12) United States Patent
Kim et al.

(10) Patent No.: US 11,513,531 B2
(45) Date of Patent: Nov. 29, 2022

(54) APPARATUS FOR PROVIDING MAP

(71) Applicant: LG Electronics Inc., Seoul (KR)

(72) Inventors: Sungmin Kim, Seoul (KR); Jihyun Kim, Seoul (KR); Jinsang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 16/637,598

(22) PCT Filed: Aug. 8, 2018

(86) PCT No.: PCT/KR2018/009046
§ 371 (c)(1),
(2) Date: Feb. 7, 2020

(87) PCT Pub. No.: WO2019/031851
PCT Pub. Date: Feb. 14, 2019

(65) Prior Publication Data
US 2020/0183389 A1 Jun. 11, 2020

Related U.S. Application Data

(60) Provisional application No. 62/542,295, filed on Aug. 8, 2017.

(51) Int. Cl.
*G05D 1/02* (2020.01)
*G05D 1/00* (2006.01)
(Continued)

(52) U.S. Cl.
CPC .......... *G05D 1/0274* (2013.01); *B60W 50/00* (2013.01); *B60W 60/005* (2020.02);
(Continued)

(58) Field of Classification Search
CPC ............ B60W 50/00; B60W 60/0025; B60W 60/005; B60W 2556/45; G05D 1/0274;
(Continued)

(56) References Cited

U.S. PATENT DOCUMENTS 5,994,790 A * 11/1999 Nagashima ............ H02H 3/087
361/87
8,989,053 B1 3/2015 Skaaksrud et al.
(Continued)

FOREIGN PATENT DOCUMENTS

JP 2002310676 10/2002
JP 2003004468 1/2003
(Continued)

OTHER PUBLICATIONS

PCT International Search Report and Written Opinion in International Appln. No. PCT/KR2018/009047, dated Nov. 6, 2018, 25 pages (with English translation).
(Continued)

*Primary Examiner* — Behrang Badii
(74) *Attorney, Agent, or Firm* — Fish & Richardson P.C.

(57) ABSTRACT

The present invention relates to an apparatus for providing a map which is mounted on a vehicle to provide map data to a plurality of electric components equipped in the vehicle. The apparatus for providing a map comprises: a communication unit for performing communication with the electric components and receiving, from a server, an original map including a plurality of layers; and a processor for calculating the reliability of information relating to the electric components using the original map and electric component information, which is received from at least one of the electric components, and performing controls relating to the electric component information based on the reliability.

18 Claims, 16 Drawing Sheets

(51) Int. Cl.
  *H04W 4/44*   (2018.01)
  *B60W 50/00*  (2006.01)
  *G06F 16/29*  (2019.01)
  *B60W 60/00*  (2020.01)
  *G01C 21/32*  (2006.01)
  *G01C 21/34*  (2006.01)

(52) U.S. Cl.
  CPC ......... *B60W 60/0025* (2020.02); *G01C 21/32* (2013.01); *G01C 21/3407* (2013.01); *G05D 1/0044* (2013.01); *G05D 1/0061* (2013.01); *G05D 1/0088* (2013.01); *G05D 1/0231* (2013.01); *G06F 16/29* (2019.01); *H04W 4/44* (2018.02); *B60W 2556/45* (2020.02)

(58) Field of Classification Search
  CPC .. G05D 1/0231; G05D 1/0044; G05D 1/0061; G05D 1/0088; G01C 21/32; G01C 21/3407; G01C 21/3881; G01C 21/3889; G06F 16/29; H04W 4/44; B60R 16/023; G06Q 50/30; G09B 29/00
  See application file for complete search history.

(56) References Cited

U.S. PATENT DOCUMENTS

| | | | |
|---|---|---|---|
| 9,616,896 B1 | 4/2017 | Letwin et al. | |
| 9,818,238 B2 | 11/2017 | Hiroki | |
| 10,564,638 B1 | 2/2020 | Lockwood et al. | |
| 10,642,279 B2 | 5/2020 | Lockwood et al. | |
| 2008/0066994 A1* | 3/2008 | Fujita | B62D 5/0463 |
| | | | 701/43 |
| 2009/0281717 A1 | 11/2009 | Nambata | |
| 2010/0153007 A1 | 6/2010 | Crowley | |
| 2012/0109763 A1* | 5/2012 | Laughner | B60L 53/31 |
| | | | 705/17 |
| 2013/0147405 A1 | 6/2013 | Yoon et al. | |
| 2014/0227907 A1* | 8/2014 | Yoshida | H01R 13/658 |
| | | | 439/625 |
| 2014/0292073 A1* | 10/2014 | Zhang | B60L 1/00 |
| | | | 307/9.1 |
| 2016/0052516 A1 | 2/2016 | Kim et al. | |
| 2016/0275131 A1 | 9/2016 | Lublinsky et al. | |
| 2017/0285632 A1 | 10/2017 | Bostick et al. | |
| 2018/0003512 A1* | 1/2018 | Lynch | G01C 21/3841 |
| 2018/0023964 A1* | 1/2018 | Ivanov | G01C 21/36 |
| | | | 701/411 |
| 2018/0087917 A1 | 3/2018 | Adachi et al. | |
| 2018/0126976 A1 | 5/2018 | Naserian et al. | |
| 2018/0202814 A1* | 7/2018 | Kudrynski | G01S 17/89 |
| 2018/0284260 A1* | 10/2018 | Oyaizu | G01C 3/06 |

FOREIGN PATENT DOCUMENTS

| | | |
|---|---|---|
| JP | 2004198997 | 7/2004 |
| JP | 2007003568 | 1/2007 |
| JP | 2007121139 | 5/2007 |
| JP | 2014092470 | 5/2014 |
| JP | 2016143324 A * | 2/2015 |
| JP | 2016133386 | 7/2016 |
| JP | 2016143324 | 8/2016 |
| KR | 20120079625 | 7/2012 |
| KR | 20150060953 | 6/2015 |
| KR | 20160128077 | 11/2016 |
| KR | 20160140055 | 12/2016 |
| KR | 20170082165 | 7/2017 |
| KR | 20170082674 | 7/2017 |
| WO | WO2017165627 | 9/2017 |

OTHER PUBLICATIONS

PCT International Search Report and Written Opinion in International Appln. No. PCT/KR2018/009048, dated Nov. 6, 2018, 24 pages (with English translation).

U.S. Office Action in U.S. Appl. No. 16/637,564, dated Aug. 9, 2021, 20 pages.

Non-Final Office Action in U.S. Appl. No. 16/637,218, dated Mar. 17, 2022, 33 pages.

* cited by examiner

[ V2X-LDM ]

[ eHorizon-ADASIS ]

(a)

(b)

APPARATUS FOR PROVIDING MAP

CROSS-REFERENCE TO RELATED APPLICATIONS

This application is a National Stage application under 35 U.S.C. § 371 of International Application No. PCT/KR2018/009046, filed on Aug. 8, 2018, which claims the benefit of U.S. Provisional Application No. 62/542,295, filed on Aug. 8, 2017. The disclosures of the prior applications are incorporated by reference in their entirety.

TECHNICAL FIELD

The present invention relates to a map providing device, and more particularly, to a map providing device mounted on a vehicle to provide map data to a plurality of electric components provided in the vehicle.

BACKGROUND

A vehicle refers to a means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

In order to further improve the convenience functions and the safety functions, a vehicle-specific communication technology is being developed. For example, a vehicle to infrastructure (V2I) that enables communication between a vehicle and an infrastructure, a Vehicle to Vehicle (V2V) that enables communication between vehicles, a Vehicle to Everything (V2X) that enables communication between a vehicle and an object, and the like.

Meanwhile, as development of an advanced driving assist system (ADAS) is actively undergoing in recent time, necessity to develop a technology for optimizing user's convenience and safety while driving a vehicle is emerged.

As part of this effort, in order to effectively transmit electronic Horizon (eHorizon) data to autonomous driving systems and infotainment systems, the European Union Original Equipment Manufacturing (EU OEM) Association has established a data specification and transmission method as a standard under the name "Advanced Driver Assist System Interface Specification (ADAS IS (ADAS)."

eHorizon, which provides map data to a plurality of electric components provided in a vehicle, is becoming an essential element for autonomous driving.

A key point of an autonomous driving standard architecture is maintenance of up-to-date data. To this end, a vehicle downloads various maps from a server for use, and transmits various kinds of information sensed by the electric components provided in the vehicle to the server. The server manages the information received from the vehicle as big data, and maintains an up-to-date state of the maps it has.

There is a problem that external information received from the server and internal information generated by the electric components are inconsistent. At least one piece of information corresponds to erroneous or wrong information, which may cause accidents or failure if the vehicle uses such information.

DETAILED DESCRIPTION OF THE DISCLOSURE

The present invention is directed to solving the aforementioned problems and other drawbacks.

One aspect of the present invention is to provide a map providing device, capable of securing safety of a vehicle in a state in which external information received from a server and internal information generated in the vehicle are inconsistent.

Another aspect of the present invention is to provide a map providing device, capable of remarkably reducing an amount of computation while securing safety of a vehicle.

The present invention relates to a map providing device mounted on a vehicle to provide map data to a plurality of electric components provided in the vehicle.

The map providing device may include a communication unit to perform communication with the electric components and to receive an original map including a plurality of layers from a server, and a processor to calculate reliability of electric component information, received from at least one of the electric components, using the electric component information and the original map, and perform a control related to the electric component information based on the reliability.

According to one embodiment, the processor may generate a processed map from the original map using the electric component information when the reliability satisfies a preset condition, and control the communication unit to provide the processed map to the electric components.

According to one embodiment, the processor may select at least one of the original map and the electric component information based on the reliability, and generate the processed map using the selected information.

According to one embodiment, information not selected by the processor of the original map and the electric component information may not be included in the processed map.

According to one embodiment, the processor may select at least one of the plurality of layers included in the original map based on the electric component information, and one or more layers of the plurality of layers not selected by the processor may be excluded from the processed map.

According to one embodiment, the original map may include a plurality of dynamic objects to be sensed by at least one electric component. The processor may select at least one of the plurality of dynamic objects included in the original map based on the electric component information, and one or more dynamic objects not selected by the processor among the plurality of dynamic objects may be excluded from the processed map.

According to one embodiment, the electric component information may include first electric component information received from a first electric component and second electric component information received from a second electric component. The processor may calculate first reliability of the first electric component information and second reliability of the second electric component information, and provide different weights to the first electric component information and the second electric component information, respectively, in consideration of the first reliability and the second reliability, in generating the processed map.

According to one embodiment, the original map may include a plurality of dynamic objects to be sensed by at least one electric component, the electric component information may include a plurality of local objects sensed by at least one electric component, and the processor may calculate the reliability using the dynamic objects and the local objects.

According to one embodiment, the processor may modify the original map using the local objects when the reliability satisfies a preset condition.

According to one embodiment, the processor may move at least one of a reference point and a reference axis of the original map using the local objects.

According to one embodiment, the processor may classify the dynamic objects into a first group including dynamic objects matching the local objects and a second group including dynamic objects not matching the local objects, and modify the dynamic objects included in the second group when the reliability satisfies the preset condition.

According to one embodiment, the processor may control the communication unit to transmit local object information related to one or more local objects to the server when there are the one or more local objects that do not match the dynamic objects among the local objects.

According to one embodiment, the processor may control the communication unit to transmit the local object information to another vehicle when there are the one or more local objects that do not match the dynamic objects among the local objects.

According to one embodiment, the local object information may include an image with the one or more local objects captured therein, and location information for guiding the one or more local objects.

According to one embodiment, the processor may generate a predicted path that the vehicle is predicted to move or must move, and change the predicted path to a new predicted path when there are the one or more local objects that do not match the dynamic objects among the local objects.

According to one embodiment, the processor may control the communication unit to receive an original map for the new predicted path from the server when the predicted path is changed to the new predicted path.

According to one embodiment, the processor may determine whether or not to transmit the electric component information to the server based on the reliability of the electric component information.

According to one embodiment, the processor may control the communication unit to transmit the electric component information to the server when the reliability of the electric component information is higher than reliability of the original map.

According to one embodiment, the processor may control the communication unit such that the original map is not transmitted to the electric components when the reliability of the electric component information is higher than the reliability of the original map.

According to one embodiment, the electric components may include an image sensor, and the electric component information may include sensing information sensed by the image sensor.

Effects of the Disclosure

Hereinafter, effects of a map providing device according to the present invention will be described.

Reliability and safety of information provided to electric components can be ensured because external information received from a server and internal information generated by the electric components in a vehicle are compared with each other and information with higher reliability is provided to the electric components. New effects can be provided that computation of a server can be reduced and only necessary information can be updated since electric component information to be updated to the server is also selected according to reliability.

BEST MODE FOR CARRYING OUT PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
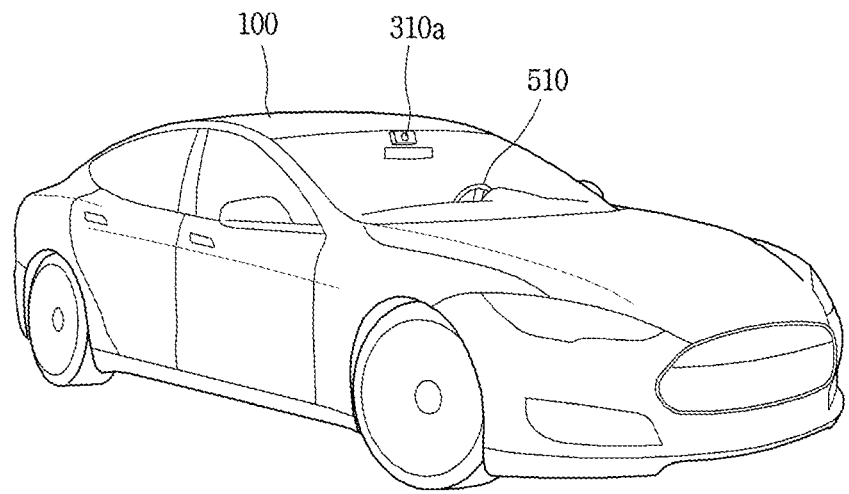
FIG. 1 is a view illustrating appearance of a vehicle in accordance with an embodiment of the present invention.
Figure 1:
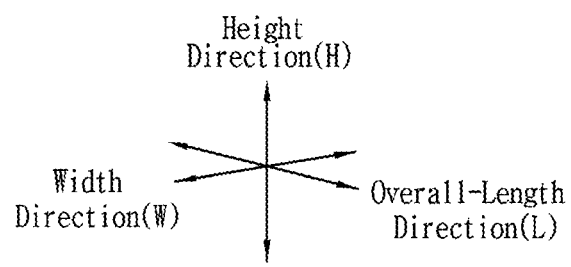

FIG. 1 is a view illustrating appearance of a vehicle in accordance with an embodiment of the present invention.

Figure 2:
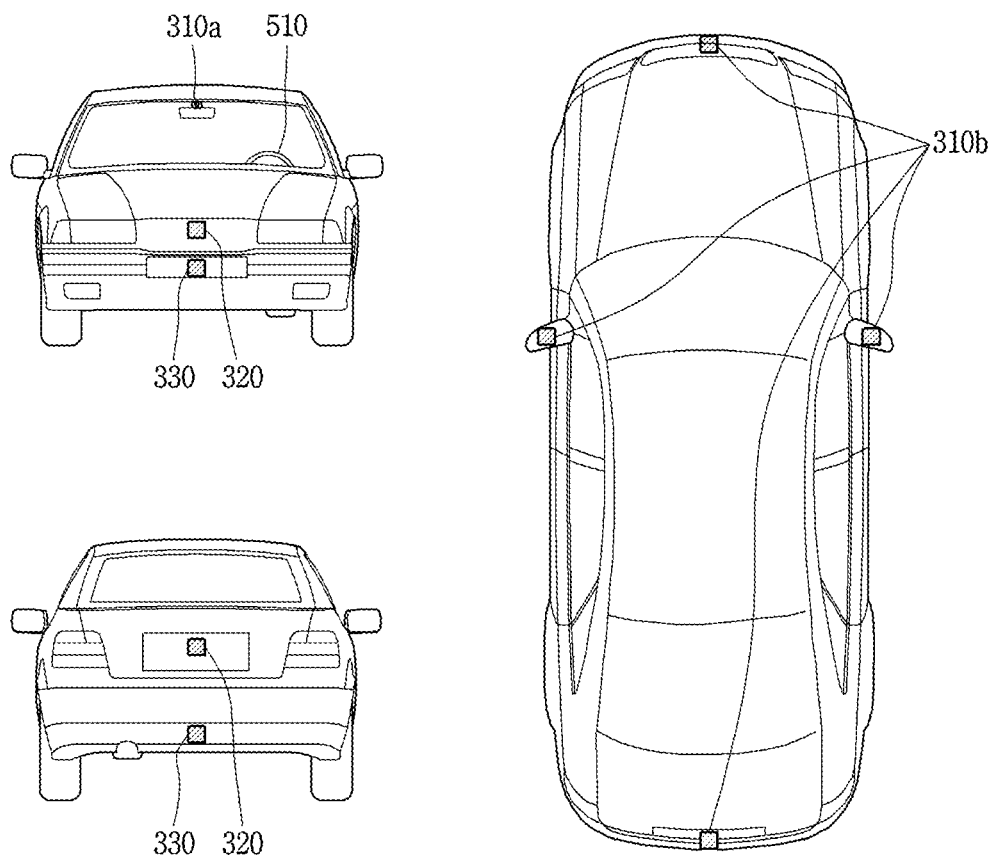
FIG. 2 is a view illustrating appearance of a vehicle at various angles in accordance with an embodiment of the present invention.

FIG. 2 is a view illustrating appearance of a vehicle at various angles in accordance with an embodiment of the present invention.

Figure 3:
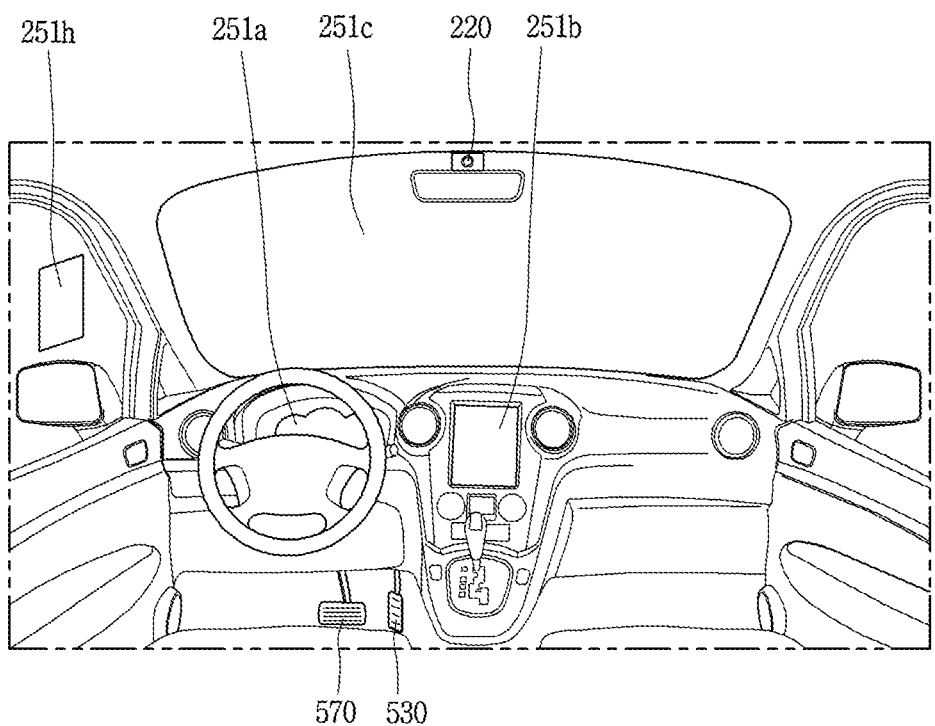
FIGS. 3 and 4 are views illustrating an inside of a vehicle in accordance with an embodiment of the present invention.
Figure 4:
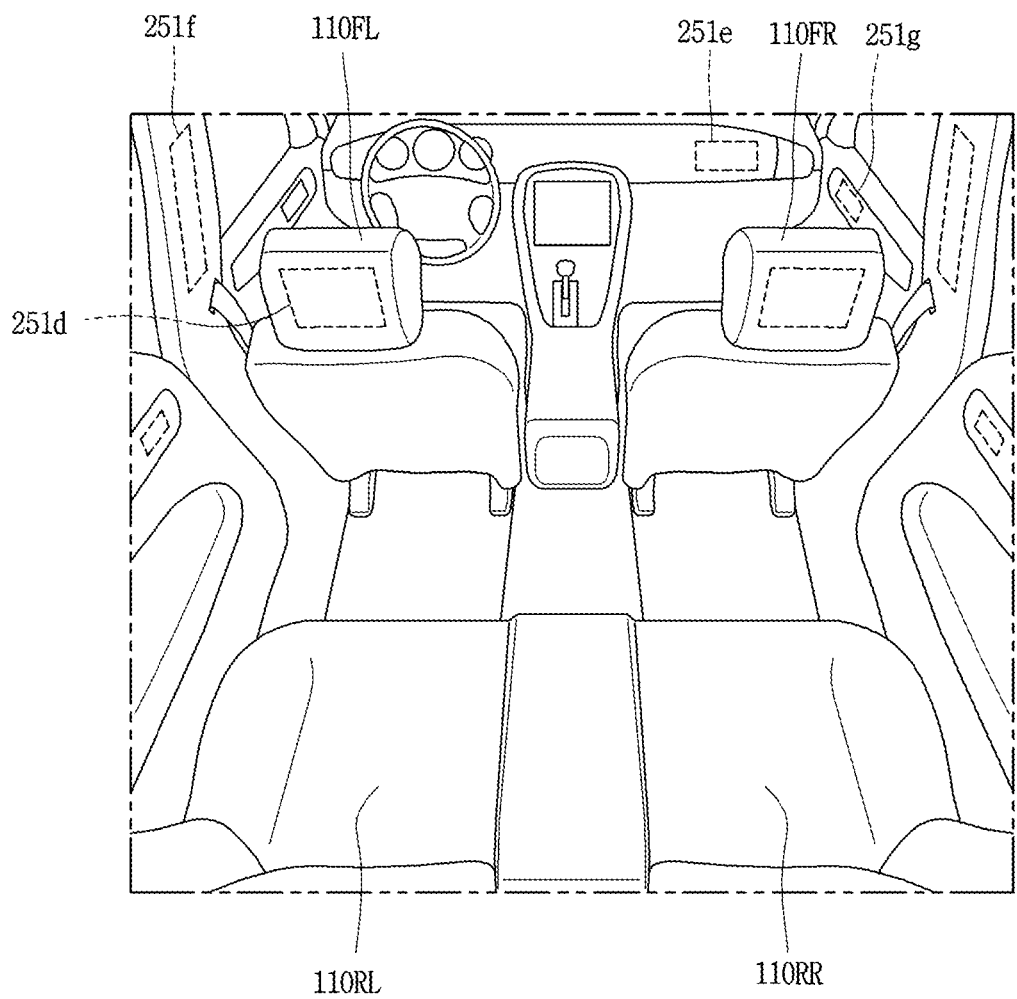

FIGS. 3 and 4 are views illustrating an inside of a vehicle in accordance with an embodiment of the present invention.

Figure 5:
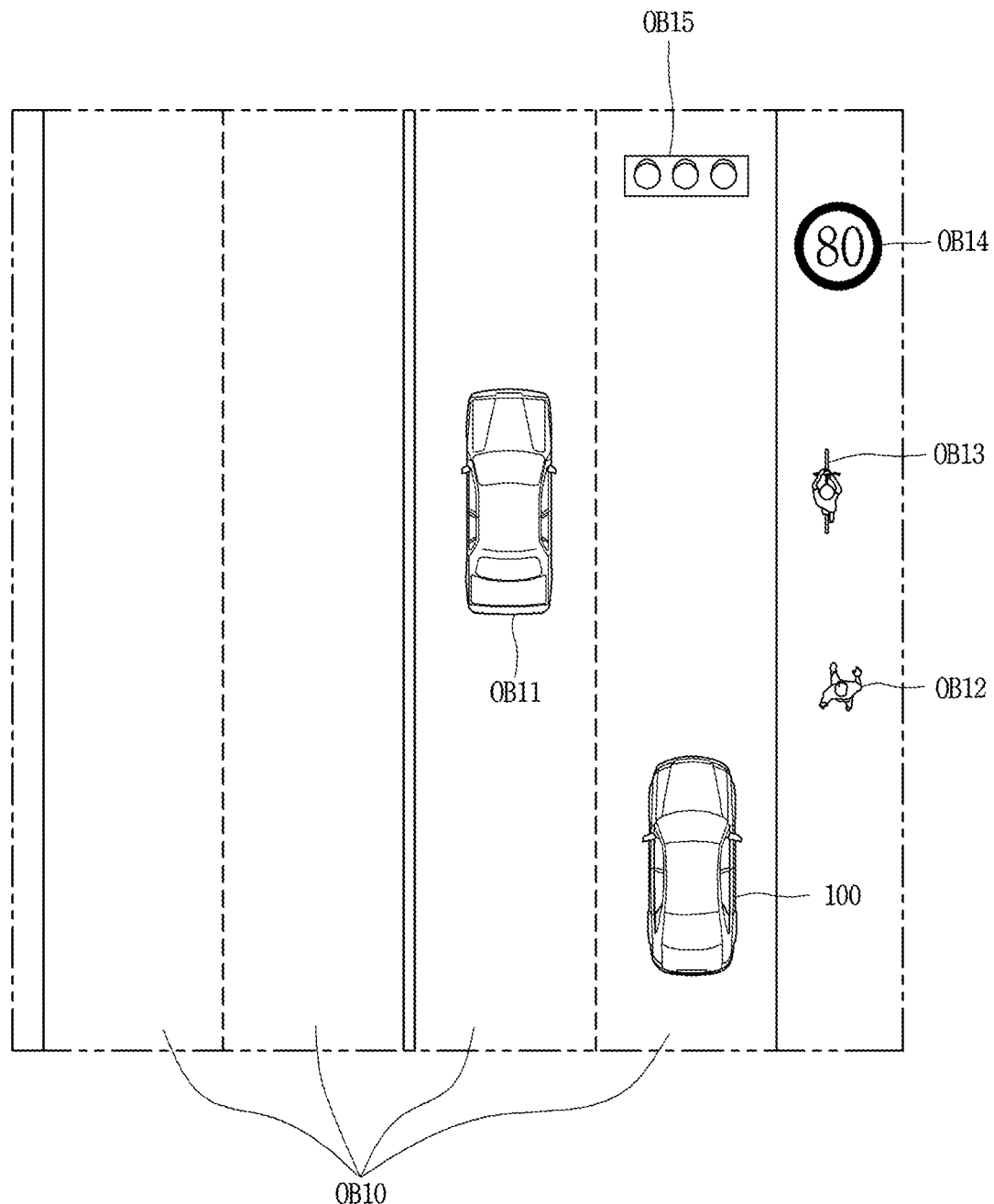
FIGS. 5 and 6 are reference views illustrating objects in accordance with an embodiment of the present invention.
Figure 6:
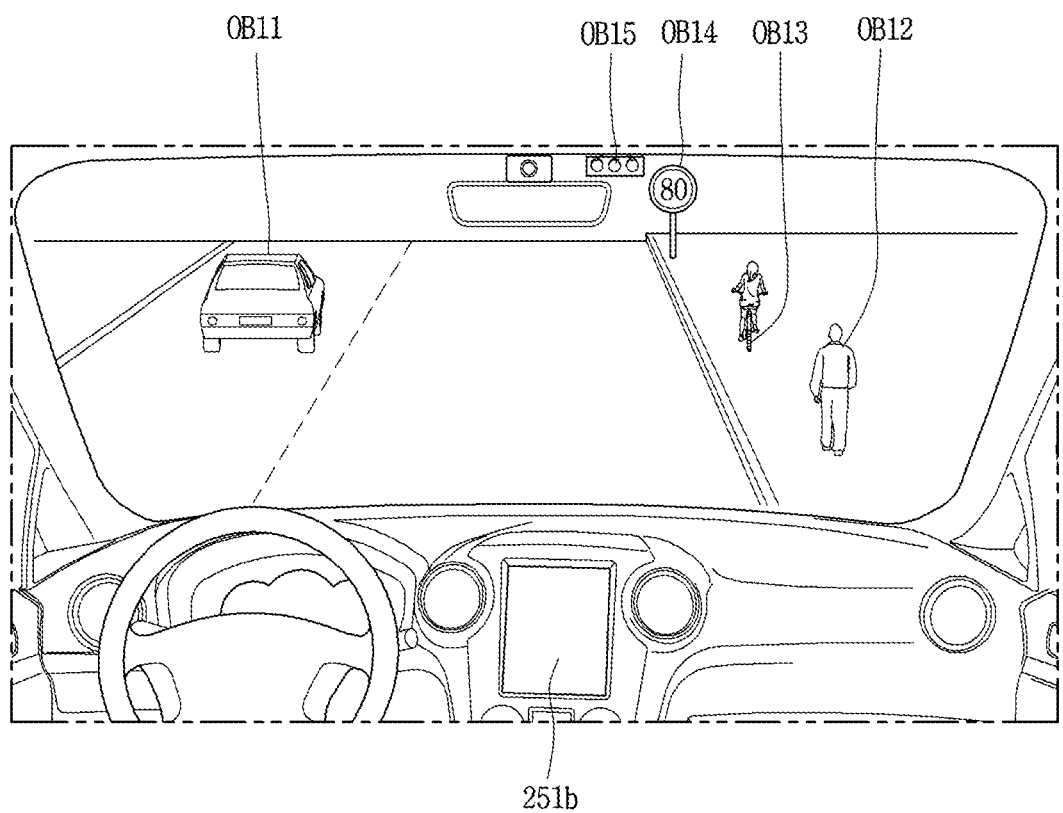

FIGS. 5 and 6 are reference views illustrating objects in accordance with an embodiment of the present invention.

Figure 7:
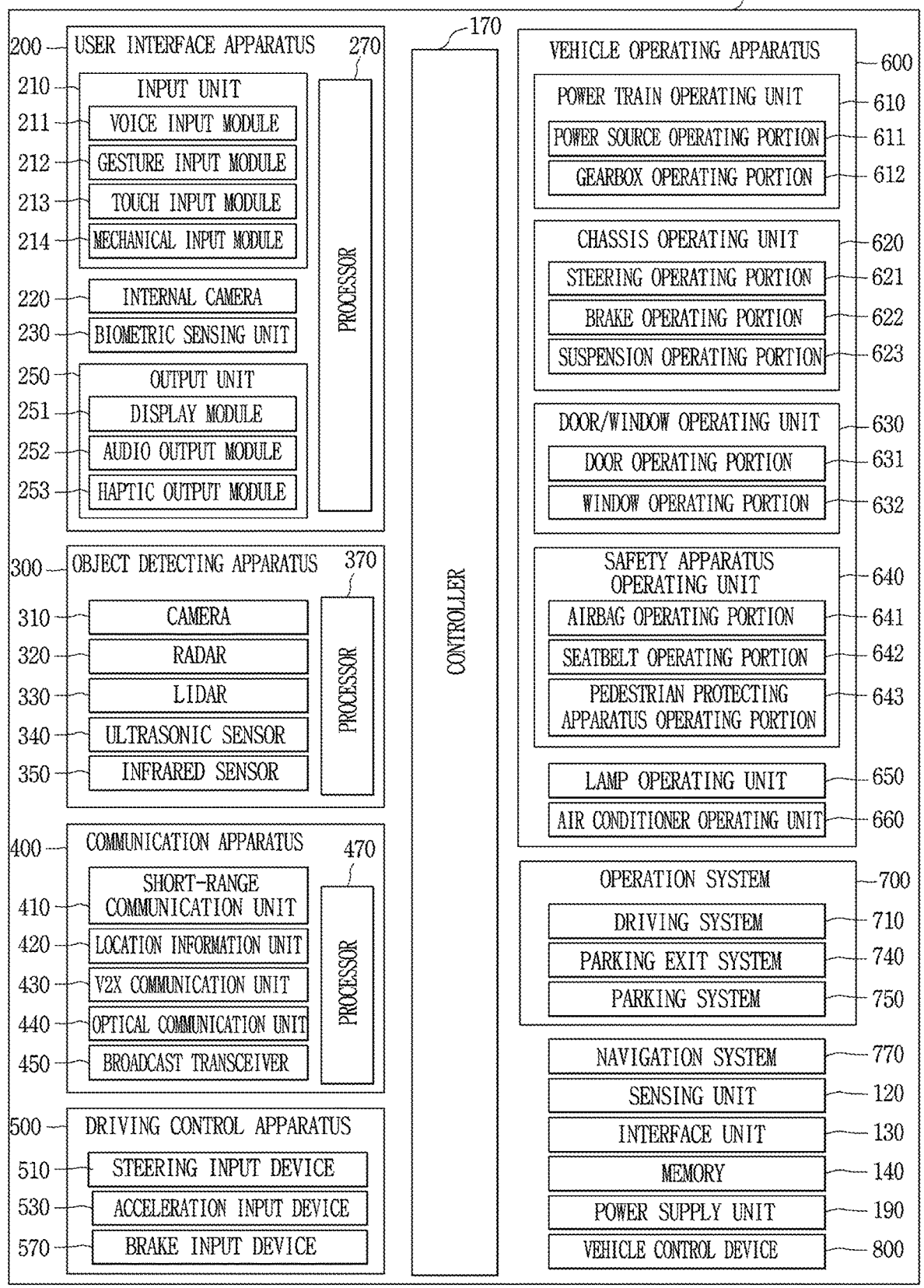
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 200 includes an audio input module 211, a gesture input module 212, a touch input module 213, and ma mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed at an appropriate position outside the vehicle to detect an object located at the front, rear, or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

On the other hand, according to an embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control the operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, description will be given in more detail of a method of autonomously driving a vehicle related to the present invention in an optimized manner or outputting warning messages related to driving of the vehicle in an optimized state, with reference to the accompanying drawings.

Figure 8:
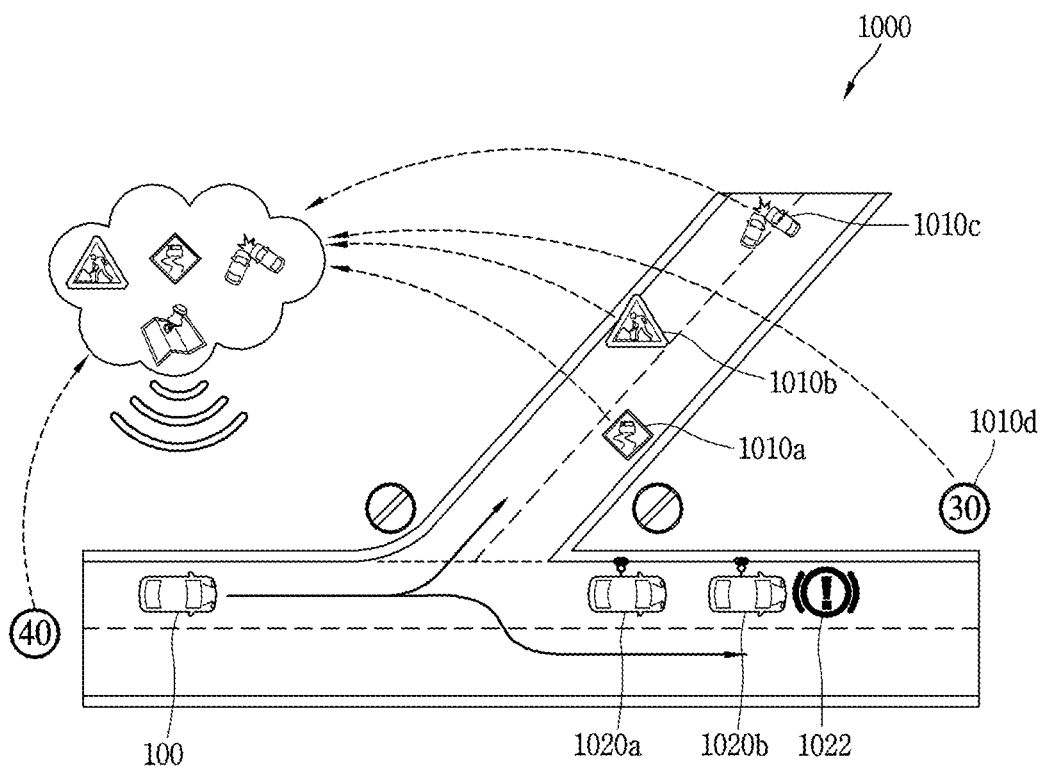
FIG. 8 is a conceptual view illustrating an eHorizon in accordance with the present invention.

FIG. 8 is a conceptual view illustrating an eHorizon in accordance with the present invention.

Referring to FIG. 8, a map providing device 800 according to the present invention may autonomously drive the vehicle 100 on the basis of eHorizon.

eHorizon may be classified into categories such as software, system, concept, and the like. The eHorizon denotes a configuration in which road shape information on a detailed map under a connected environment of an external server (cloud), V2X (Vehicle to everything) or the like and real-time events such as real-time traffic signs, road surface conditions, accidents and the like are merged to provide relevant information to autonomous driving systems and infotainment systems.

For an example, eHorizon may refer to an external server (a cloud or a cloud server).

In other words, eHorizon may play the role of transferring a detailed map road shape and real time events in front of the vehicle to autonomous driving systems and infotainment systems under an external server/V2X environment.

In order to transfer eHorizon data (information) transmitted from the eHorizon (i.e., external server) to autonomous driving systems and infotainment systems, a data specification and transmission method may be formed in accordance with a standard called "Advanced Driver Assistance Systems Interface Specification (ADAS IS)."

The map providing device 800 associated with the present disclosure may use information received from eHorizon for autonomous driving systems and/or infotainment systems.

For example, autonomous navigation systems may be divided into safety aspects and ECO aspects.

In terms of the safety aspect, the map providing device 800 according to the present disclosure may perform an ADAS function such as Lane Keeping Assist (LKA), Traffic Jam Assist (TJA) or the like, and/or an AutoDrive (AD) function such as advance, road joining, lane change or the like using road shape information and event information received from eHorizon and surrounding object information sensed through the sensing unit 840 provided in the vehicle.

Furthermore, in terms of the ECO aspect, the map providing device 800 may receive inclination information, traffic light information, and the like on a front road from eHorizon to control the vehicle so as to achieve efficient engine thrust, thereby enhancing fuel efficiency.

The infotainment system may include convenience aspects.

For an example, the map providing device 800 may receive accident information, road surface condition information, and the like on a front road from eHorizon to output them on a display unit (for example, HUD (Head Up Display), CID, Cluster, etc.) provided in the vehicle, so as to provide guidance information for allowing the driver to perform safe driving.

Referring to FIG. 8, the eHorizon (external server) may receive location information and/or road-specific speed limit information 1010d related to various event information (for example, road surface state information 1010a, construction information 1010b, accident information 1010c, etc.), which have been generated on the road, from the vehicle 100 or other vehicles 1020a, 1020b or collect them from infrastructures (for example, a measuring device, a sensing device, a camera, etc.) installed on the road.

In addition, the event information and the road-specific speed limit information may be linked to map information or may be updated.

In addition, the location information related to the event information may be divided into lane units.

By using such information, the eHorizon (external server) of the present invention can provide information necessary for an autonomous driving system and an infotainment system to each vehicle based on a detailed map capable of determining a road situation (or road information) in the lane unit.

In other words, the eHorizon (external server) of the present disclosure may provide an absolute highly-detailed map using an absolute coordinate of road-related information (for example, event information, location information of the vehicle 100, etc.) based on a detailed map.

The road-related information provided by the eHorizon may be information corresponding to a predetermined region (predetermined space) with respect to the vehicle 100.

On the other hand, the map providing device 800 of the present invention may acquire location information related to another vehicle through communication with the another vehicle. Communication with the another vehicle may be performed through V2X (Vehicle to everything) communication, and data transmitted/received to/from the another vehicle through the V2X communication may be data in a format defined by a Local Dynamic Map (LDM) standard.

The LDM denotes a conceptual data storage located in a vehicle control device (or ITS station) including information associated with a safe and normal operation of an application (or application program) provided in a vehicle (or ITS (Intelligent Transport System)). The LDM may, for example, comply with EN standards.

The LDM differs from the foregoing ADAS MAP in the data format and transmission method. For an example, the ADAS MAP may correspond to a highly detailed MAP having an absolute coordinate received from the eHorizon (external server), and the LDM may denote a highly detailed MAP having relative coordinates based on data transmitted and received through V2X communication.

The LDM data (or LDM information) denotes data mutually transmitted and received in V2X communication (vehicle to everything) (for example, V2V (Vehicle to Vehicle) communication, V2I (Vehicle to Infra) communication, V2P (Vehicle to Pedestrian) communication).

The LDM is a concept of a storage for storing data transmitted and received in V2X communication, and the LDM may be formed (stored) in a vehicle control device provided in each vehicle.

The LDM data may denote data exchanged between a vehicle and a vehicle (infrastructure, pedestrian) or the like, for an example. The LDM data may include a Basic Safety Message (BSM), a Cooperative Awareness Message (CAM), and a Decentralized Environmental Notification message (DENM), for an example.

The LDM data may be referred to as a V2X message or an LDM message, for an example.

The vehicle control device associated with the present disclosure may efficiently manage LDM data (or V2X messages) efficiently transmitted and received between vehicles using the LDM.

Based on LDM data received via V2X communication, the LDM may store, distribute to another vehicle, and continuously update all relevant information (for example, a location, a speed, a traffic light status, weather information, a road surface condition, and the like of the vehicle (another vehicle)) related to a traffic situation around a place where the vehicle is currently located (or a road situation for an area within a predetermined distance from a place where the vehicle is currently located).

For an example, a V2X application provided in the map providing device 800 registers with the LDM, and receives a specific message such as all the DENMs in addition to a warning about a failed vehicle. Then, the LDM may automatically assign the received information to the V2X application, and the V2X application may control the vehicle based on the information assigned from the LDM.

As described above, the vehicle of the present disclosure may control the vehicle using the LDM formed by the LDM data collected through V2X communication.

The LDM associated with the present disclosure may provide road-related information to the vehicle control device. The road-related information provided by the LDM provides only a relative distance and a relative speed with respect to another vehicle (or an event generation point), other than map information having absolute coordinates.

In other words, the vehicle of the present disclosure may construct autonomous driving using an ADAS MAP (absolute coordinate highly-detailed MAP) according to the ADASIS standard provided by eHorizon, but it may be used only to determine a road condition in a surrounding area of the vehicle.

In addition, the vehicle of the present disclosure may construct autonomous driving using an LDM (relative coordinate highly-detailed MAP) formed by LDM data received through V2X communication, but there is a limitation in that accuracy is inferior due to insufficient absolute location information.

The vehicle control device included in the vehicle of the present disclosure may generate a merged detailed map using an ADAS MAP received from eHorizon and LDM data received through V2X communication, and control (autonomously drive) the vehicle in an optimized manner using the merged detailed map.

Hereinafter, a vehicle control device capable of generating a merged detailed map will be described in more detail with reference to the accompanying drawings.

Figure 9:
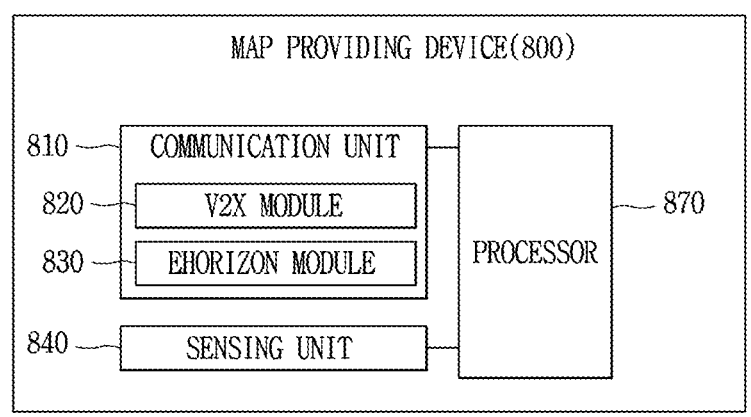
FIG. 9 is a conceptual view illustrating a map providing device in accordance with one embodiment of the present invention.
Figure 10A:
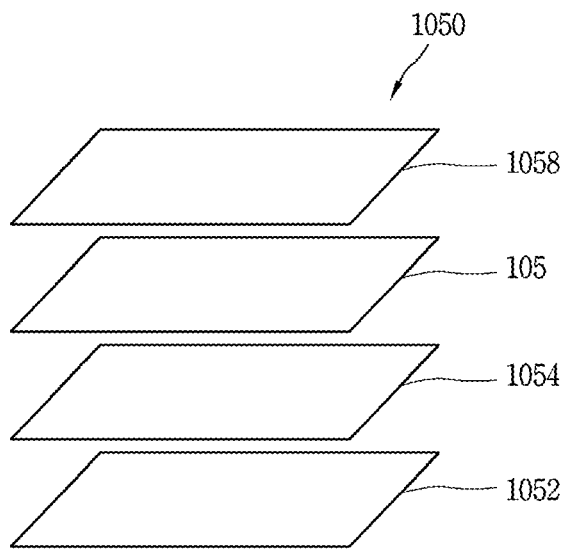
FIGS. 10A and 10B are conceptual views illustrating a Local Dynamic Map (LDM) and an Advanced Driver Assistance System (ADAS) MAP according to the present invention.
Figure 10B:
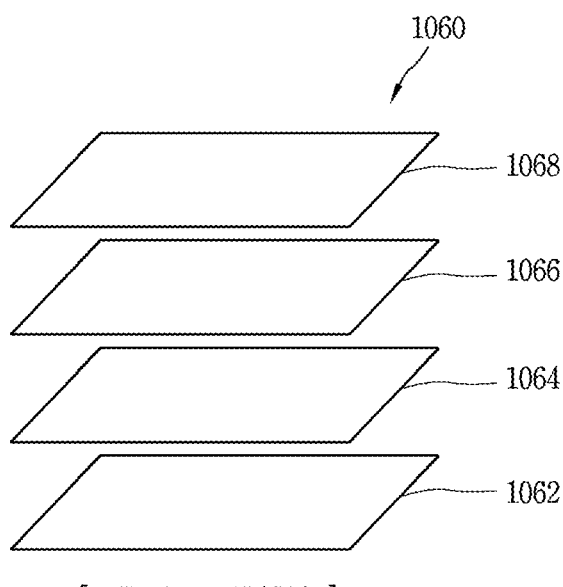

FIG. 9 is a conceptual view illustrating a vehicle control device in accordance with one embodiment of the present invention. FIGS. 10A and 10B are conceptual views illustrating a Local Dynamic Map (LDM) and an Advanced Driver Assistance System (ADAS) MAP according to the present invention.

As illustrated in FIG. 9, the vehicle control device 800 according to the present invention may include a communication unit 810, a sensing unit 820, a display unit 840, a processor 870 and the like.

The communication unit 810 may be the communication device 400 described above.

In addition, the communication unit 810 associated with the present disclosure may determine a current location of the vehicle through the location information unit 420. Furthermore, the communication unit 810 may perform communication with a surrounding vehicle (or another vehicle) or perform communication with an external server (eHorizon or cloud server).

In other words, the communication unit 810 associated with the present disclosure may be configured to acquire location information of the vehicle, and perform communication with at least one of an external server and another vehicle.

As shown in FIG. 9, the communication unit 810 may include a V2X module 820 and an eHorizon module 830.

The V2X module 820 may perform communication with another vehicle. That is, the communication unit 810 may perform communication with a nearby vehicle (or another vehicle). This may be referred to as Vehicle to everything (V2V) communication. V2X communication may be generally defined as a technology for exchanging information with vehicles, and sharing information related to location, speed and the like of a nearby vehicle.

Further, the communication unit 810 may perform communication with all of the devices (for example, a mobile terminal, a server, etc.) capable of performing communication. This may be referred to as Vehicle to everything (V2X) communication. The V2X communication may be defined as technology of exchanging or sharing information, such as traffic condition and the like, while performing communication with a road infrastructure and other vehicles during driving.

V2V communication may be understood as an example of V2X communication or as a concept included in V2X communication.

The processor 870 may perform V2V communication or V2X communication with a nearby vehicle (another vehicle) through the communication unit 810.

Here, the nearby vehicle may denote at least one of a vehicle existing within a predetermined distance from the vehicle 100 and a vehicle entering within a predetermined distance based on the vehicle 100.

The present disclosure may not be limited thereto, and the nearby vehicle may include all vehicles capable of performing communication with the communication unit 810 of the vehicle 100. According to this specification, for the sake of explanation, an example will be described in which the nearby vehicle is a vehicle existing within a predetermined distance based on the vehicle 100 or a vehicle entering within a predetermined distance based on the vehicle 100.

The predetermined distance may be determined based on a distance capable of performing communication through the communication unit 810, determined according to a specification of a product, or determined/varied based on a user's setting or V2X communication standard.

Specifically, the V2X module 820 may be configured to receive LDM data from another vehicle. The LDM data may be a V2X message (BSM, CAM, DENM, etc.) transmitted and received between vehicles through V2X communication.

The LDM data may include the location information of another vehicle.

The processor 870 may determine a relative location between the vehicle of the present invention and another vehicle based on the location information of the vehicle acquired through the communication unit 810 and the location information of the another vehicle included in the LDM data received through the V2X module 820.

In addition, the LDM data may include speed information of another vehicle. The processor 870 may also determine a relative speed of the another vehicle using speed information of the vehicle of the present invention and the speed information of the another vehicle. The speed information of the vehicle may be calculated using a degree to which the location information of the vehicle received through the communication unit 810 changes over time or calculated based on information received from the driving operation device 500 or the power train driving unit 610 of the vehicle 100.

The V2X module 820 may be the V2X communication unit 430 described above.

Meanwhile, the communication unit 810 of the present disclosure may include an eHorizon module 830.

The eHorizon module 830 may perform wireless communication with an external server (eHorizon). The eHorizon module 830 may receive an ADAS MAP from the external server.

The ADAS MAP may include map information. In the map information included in the ADAS MAP, information associated with a road (event information) may be divided into lane units.

The processor 870 of the vehicle control device 800 associated with the present disclosure may determine an absolute coordinate of the information (event information) associated with a road based on the ADAS MAP received from the external server (eHorizon) through the eHorizon module 830. In addition, the processor 870 may autonomously drive the vehicle or perform a vehicle control using the absolute coordinate of the information (event information) associated with the road.

FIG. 10A illustrates an example of a data format of LDM data (or LDM) transmitted and received between vehicles via V2X communication, and FIG. 10B illustrates an example of a data format of an ADAS MAP received from an external server (eHorizon).

Referring to FIG. 10A, the LDM data (or LDM) 1050 may be formed to have four layers.

The LDM data 1050 may include a first layer 1052, a second layer 1054, a third layer 1056 and a fourth layer 1058.

The first layer 1052 may include static information, for example, map information, among road-related information.

The second layer 1054 may include landmark information (for example, specific place information specified by a maker among a plurality of place information included in the map information) among information associated with road. The landmark information may include location information, name information, size information, and the like.

The third layer 1056 may include traffic situation related information (for example, traffic light information, construction information, accident information, etc.) among the road-related information. The construction information and the accident information may include location information.

The fourth layer 1058 may include dynamic information (for example, object information, pedestrian information, other vehicle information, etc.) among the road-related information. The object information, pedestrian information, and other vehicle information may include location information.

In other words, the LDM data 1050 may include information sensed through a sensing unit of another vehicle or information sensed through a sensing unit of the vehicle of the present invention, and may include road-related information that is transformed in real time as it goes from the first layer to the fourth layer.

Referring to FIG. 10B, the ADAS MAP may be formed to have four layers similar to the LDM data.

The ADAS MAP 1060 may denote data received from eHorizon and formed to conform to the ADASIS standard.

The ADAS MAP 1060 may include a first layer 1062 to a fourth layer 1068.

The first layer 1062 may include topology information. The topology information is, for example, information that explicitly defines a spatial relationship, and may refer to map information.

The second layer 1064 may include landmark information (for example, specific place information specified by a maker among a plurality of place information included in the map information) among information associated with the road. The landmark information may include location information, name information, size information, and the like.

The third layer 1066 may include highly detailed map information. The highly detailed MAP information may be referred to as an HD-MAP, and road-related information (for example, traffic light information, construction information, accident information) may be recorded in the lane unit. The construction information and the accident information may include location information.

The fourth layer 1068 may include dynamic information (for example, object information, pedestrian information, other vehicle information, etc.). The object information, pedestrian information, and other vehicle information may include location information.

In other words, the ADAS MAP 1060 may include road-related information that is transformed in real time as it goes from the first layer to the fourth layer, similarly to the LDM data 1050.

In addition, the map providing device 800 related to the present invention may include a sensing unit 840.

The sensing unit 840 may be the object detecting apparatus 300 described with reference to FIG. 7 or the sensing unit 120 provided in the vehicle 100.

In addition, the sensing unit 840 may be a sensing unit independent of the object detecting apparatus 300 provided in the vehicle or the sensing unit 120 provided in the vehicle 100. The sensing unit 840 may include the characteristics of the sensing unit 120 or the object detecting apparatus 300 described in FIG. 7 even when the sensing unit 840 is an independent sensing unit.

The sensing unit 820 may include the camera 310 described with reference to FIG. 7.

The sensing unit 840 may also be implemented in combination of at least two of the camera 310, the radar 320, the LiDAR 330, the ultrasonic sensor 340 and the infrared sensor 350 provided in the object detecting apparatus 300, and the sensing unit 120.

The sensing unit 840 may sense an object existing in the vicinity of the vehicle 100 and sense information related to the object.

For example, the object may include other vehicles, people, objects, terrains, and the like which exist near the vehicle 100.

The sensing unit 820 may sense information related to the vehicle 100 of the present invention.

The information related to the vehicle may be at least one of vehicle information (or a driving status of the vehicle) and the surrounding information related to the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user is present in the vehicle, information associated with the user (for example, whether or not the user is an authenticated user), and the like.

The surrounding information of the vehicle may be a state of road surface on which the vehicle is traveling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

The surrounding information (or surrounding environment information) of the vehicle may include external information related to the vehicle (e.g., ambient brightness, temperature, a position of the sun, information related to nearby subject (a person, another vehicle, a sign, etc.), a type of a driving road surface, a landmark, line information, and driving lane information), and information required for an autonomous driving/autonomous parking/automatic parking/manual parking mode.

In addition, the surrounding information may further include a distance from an object existing around the vehicle to the vehicle 100, a type of the object, a parking space for the vehicle, an object for identifying the parking space (for example, a parking line, a string, another vehicle, a wall, etc.), and the like.

Hereinafter, for the sake of explanation, one example in which the sensing unit 820 is provided separately in the map providing device 800 will be described. Allowing the processor 870 to acquire any information through the sensing unit 820 may be understood as allowing the processor 870 to acquire any information using at least one of the object detecting apparatus 300 and the sensing unit 120 provided in the vehicle 100.

The map providing device 800 of the present disclosure may include a processor 870 capable of controlling a communication unit 810, a V2X module 820, an eHorizon module 830, a sensing unit 840, and the like.

The processor 870 may be the controller 170 described in FIG. 7.

The processor 870 may control the components described in FIG. 7 and the components described in FIG. 8.

The processor 870 may autonomously drive the vehicle 100.

For example, the processor 870 may autonomously drive the vehicle 100 based on information sensed through the sensing unit 840 and information received through the communication unit 810.

The technology for autonomously driving a vehicle is a general technology, and thus more detailed description thereof will be omitted Specifically, the processor 870 may control the communication unit 810 to acquire the location information of the vehicle. For example, the processor 870 may acquire the location information (location coordinates) of the vehicle 100 through the location information unit 420 of the communication unit 810.

Furthermore, the processor 870 may control the eHorizon module 830 of the communication unit 810 to receive map information from an external server. Here, the eHorizon module 830 may receive an ADAS MAP from the external server (eHorizon). The map information may be included in the ADAS MAP.

In addition, the processor 870 may control the V2X module 820 of the communication unit 810 to receive location information of another vehicle from the another vehicle. Here, the V2X module 820 may receive LDM data from another vehicle. The location information of the another vehicle may be included in the LDM data.

The another vehicle denotes a vehicle existing within a predetermined distance from the vehicle, and the predetermined distance may be a communication-available distance of the communication unit 810 or a distance set by a user.

The processor 870 may control the communication unit to receive map information from an external server and the location information of the another vehicle from the another vehicle.

Furthermore, the processor 870 may merge the acquired location information of the vehicle and the received location information of the another vehicle into the received map information, and control the vehicle 100 based on at least one of the merged map information and the information associated with the vehicle sensed through the sensing unit 840.

Here, the map information received from the external server may denote highly detailed map information (HD-MAP) included in the ADAS MAP. The highly detailed map information may be recorded with road-related information in the lane unit.

The processor 870 may merge the location information of the vehicle 100 and the location information of another vehicle into the map information in the lane unit. In addition, the processor 870 may merge road-related information received from an external server and road-related information received from another vehicle into the map information in the lane unit.

The processor 870 may generate an ADAS MAP required for the control of the vehicle using an ADAS MAP received from an external server and information associated with the vehicle received through the sensing unit 840.

Specifically, the processor 870 may apply information associated with the vehicle sensed within a predetermined range through the sensing unit 840 to map information received from the external server.

Here, the predetermined range may be an available distance allowing the sensing unit 840 to sense information or may be a distance set by a user.

The processor 870 may apply information associated with a vehicle sensed within a predetermined range through the sensing unit to the map information and then additionally merge the location information of another vehicle thereto to control the vehicle.

In other words, when information associated with a vehicle sensed within a predetermined range through the sensing unit is applied to map information, the processor 870 may use only the information within the predetermined range from the vehicle, and thus a range capable of controlling the vehicle may be local.

However, the location information of another vehicle received through the V2X module may be received from the another vehicle existing in a space out of the predetermined range. It may be because the communication-available distance of the V2X module communicating with the another vehicle through the V2X module is farther than a predetermined range of the sensing unit 840.

As a result, the processor 870 may merge the location information of another vehicle included in LDM data received through the V2X module 820 into map information that has sensed information associated with the vehicle to acquire the location information of the vehicle existing in a broader range, thereby more effectively controlling the vehicle.

For example, it is assumed that a plurality of other vehicles are crowded ahead in a lane in which the vehicle exists, and it is assumed that the sensing unit is able to sense only the location information of an immediately preceding vehicle.

In this case, when only information associated with a vehicle sensed within a predetermined range on map information is used, the processor 870 may generate a control command for controlling the vehicle such that the vehicle overtakes the preceding vehicle.

However, in reality, a plurality of other vehicles are crowded ahead, and the vehicle may be in a situation where it is not easy to pass and cut in.

At this time, the present disclosure may acquire the location information of another vehicle received through the V2X module. At this time, the received location information of the another vehicle may include location information of not only a vehicle immediately in front of the vehicle 100 but also a plurality of other vehicles in front of the preceding vehicle.

The processor 870 may additionally merge the location information of the plurality of other vehicles acquired through the V2X module to map information to which information associated with the vehicle is applied, to determine that it is in an inappropriate situation to pass and cut in the preceding vehicle.

Through the foregoing configuration, the present disclosure may overcome the conventional technical limitations in which only information associated with the vehicle acquired through the sensing unit 840 is merely merged to highly detailed map information to allow autonomous driving only within a predetermined range. In other words, according to the present disclosure, not only information associated with a vehicle sensed through the sensing unit but also information (a speed of another vehicle, a location of another vehicle) associated with another vehicle received from the another vehicle at a greater distance than the predetermined range through the V2X module may additionally be used, thereby more accurately and stably performing the vehicle control.

Vehicle control described in this specification may include at least one of autonomously driving the vehicle 100 and outputting a warning message associated with the driving of the vehicle.

Hereinafter, a method of allowing the processor to control a vehicle using LDM data received through the V2X module, an ADAS MAP received from the external server (eHorizon), and information associated with the vehicle sensed through the sensing unit provided in the vehicle will be described in detail with reference to the accompanying drawings.

Figure 11A:
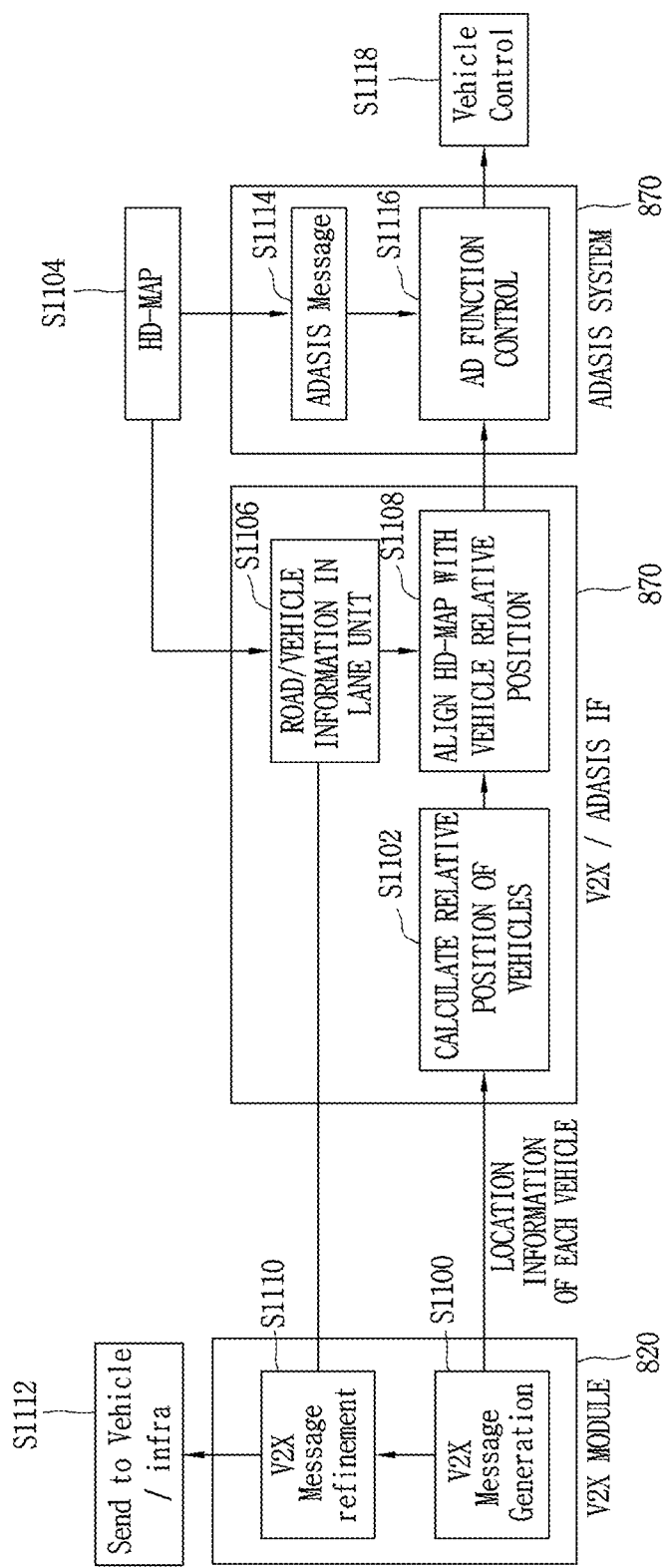
FIGS. 11A and 11B are conceptual views illustrating a method of controlling a vehicle using an LDM and an ADAS MAP according to the present invention.
Figure 11B:
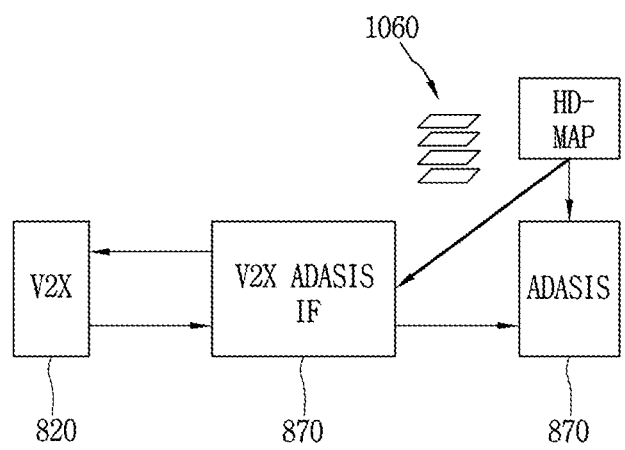
Figure 11B:
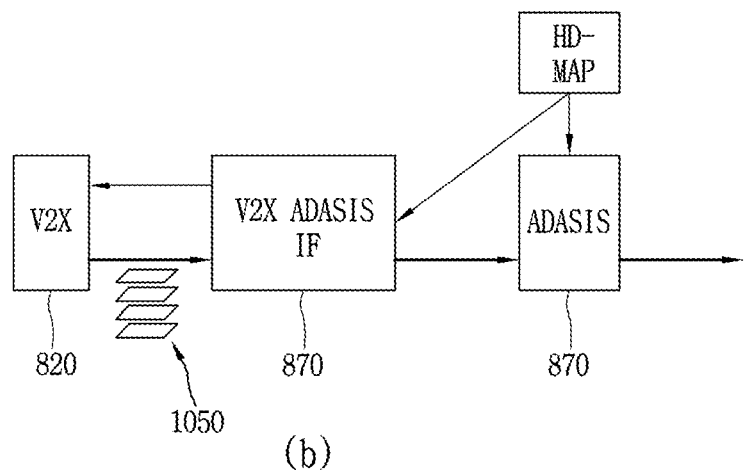

FIGS. 11A and 11B are conceptual views illustrating a method of controlling a vehicle using an LDM and an ADAS MAP according to the present invention.

First, referring to FIG. 11A, the processor 870 included in the map providing device 800 of the present disclosure may include a V2X/ADASIS IF (InterFace) and an ADASIS system. The V2X/ADASIS IF and ADASIS system may be in a hardware configuration or in the form of a distinctive component according to the function in terms of software.

The V2X module 820 of the communication unit 810 may generate a V2X message (S1100). Here, the V2X message may include LDM data.

For an example, the V2X module 820 may generate the V2X message based on the receipt of a V2X message transmission request from an infrastructure installed in another vehicle or on a road.

For another example, the V2X module 820 may generate the V2X message to request the location information of another vehicle to the another vehicle. Here, the processor 870 may transmit the V2X message to the another vehicle, and receive the location information of another vehicle from the another vehicle.

At this time, the another vehicle to which the V2X message is transmitted may be another vehicle existing within a predetermined distance from the vehicle 100. The predetermined distance may be determined by an available distance of the V2X module or the setting of a user. When a number of other vehicles to which the V2X message is transmitted is plural, the processor 870 may acquire location information of the another vehicle from at least one of the plurality of other vehicles through the V2X module 820.

Then, the processor 870 (V2X/ADASIS IF) may calculate a relative location (relative distance) between the vehicle and the another vehicle based on the received location information of the another vehicle (S1104).

In addition, the processor 870 may receive an ADAS MAP from the external server (eHorizon) through the eHorizon module 830 (S1104). The ADAS MAP may include a detailed map capable of receiving map information, namely, road-related information in the lane unit.

The processor 870 may determine information (vehicle information) associated with roads in the lane unit from the received map information (S1106).

Then, the processor 870 may align a relative location between the vehicle and the another vehicle to the received map information (S1108).

In other words, the processor 870 may extract a relative location between the vehicle and another vehicle that has transmitted LDM data based on the LDM data received through the V2X module 820, and align the extracted relative location of the another vehicle to an ADAS MAP (map information) received through the eHorizon module 830.

In other words, the present disclosure may align a relative location between the vehicle and the another vehicle extracted through V2X communication to a detailed map (ADAS MAP received from the external server (eHorizon)) capable of merging information in the lane unit, to generate a merged map capable of determining a real-time relative location between the vehicle and the another vehicle in the lane unit.

The V2X module 820 may redefine a V2X message using the ADAS MAP in which the relative location between the vehicle and the another vehicle is aligned in the lane unit (S1110). Then, the processor 870 may transmit the redefined V2X message to the another vehicle or infrastructure.

In addition, the processor 870 may generate an ADASIS standard message using the ADAS MAP received from the external server (eHorizon) (S1114). The message may be a message used for autonomous driving of the vehicle. For example, the message may include a warning message generated during autonomous driving, a notification message for notifying information associated with roads such as accident information/construction information, and the like.

The processor 870 may transmit an ADAS MAP (map information, highly detailed MAP), in which a relative location between the vehicle and the another vehicle is aligned in the lane unit, to an ADASIS system (S1108). Then, the processor 870 may perform an AD function (autonomous driving) using the ADASIS standard message and the ADAS MAP (map information, highly detailed MAP) in which the relative location between the vehicle and the another vehicle is aligned in the lane unit (S1118).

With this configuration, the processor 870 of the present disclosure can control the vehicle using the ADAS MAP (map information, highly detailed MAP) in which the relative location between the vehicle and the another vehicle is aligned in the lane unit (S1118).

In other words, the present disclosure may calculate a relative location (network) between the vehicle and the another vehicle using the location information of the another vehicle received from the another vehicle through V2X communication. Then, the calculated relative location information may be aligned in the lane unit on the highly detailed MAP received from the external server (eHorizon).

The ADAS IS system may enhance accuracy of autonomous driving (AD) functions using the ADAS MAP in which the relative location between the vehicle and the another vehicle is aligned in the lane unit, so as to use the same for an autonomous driving control.

In addition, the V2X module may enhance accuracy of outputting a warning message associated with driving of the vehicle using a highly detailed MAP capable of recording road-related information in the lane unit.

Meanwhile, the LDM data and the ADAS MAP of the present disclosure may use different coordinates. In this case, as illustrated in FIG. 11B, the processor 870 may convert a coordinate system of an ADAS MAP 1060 received via the eHorizon module 830 into a coordinate system of LDM data received via the V2X module 820 or convert the coordinate system of the LDM data 1050 into a coordinate system of the ADAS MAP.

The types of coordinate systems may include various types of coordinate systems such as a longitude/latitude coordinate system, a Cartesian coordinate system, a polar coordinate system, and the like, and the processor 870 may perform coordinate system conversion such that the coordinate system of the LDM data received through the V2X module corresponds to the coordinate system of the ADAS MAP received through the eHorizon module.

Through this, the processor 870 of the present disclosure may merge (align) the location information of the another vehicle included in the LDM data to the ADAS MAP in the lane unit.

Figure 12:
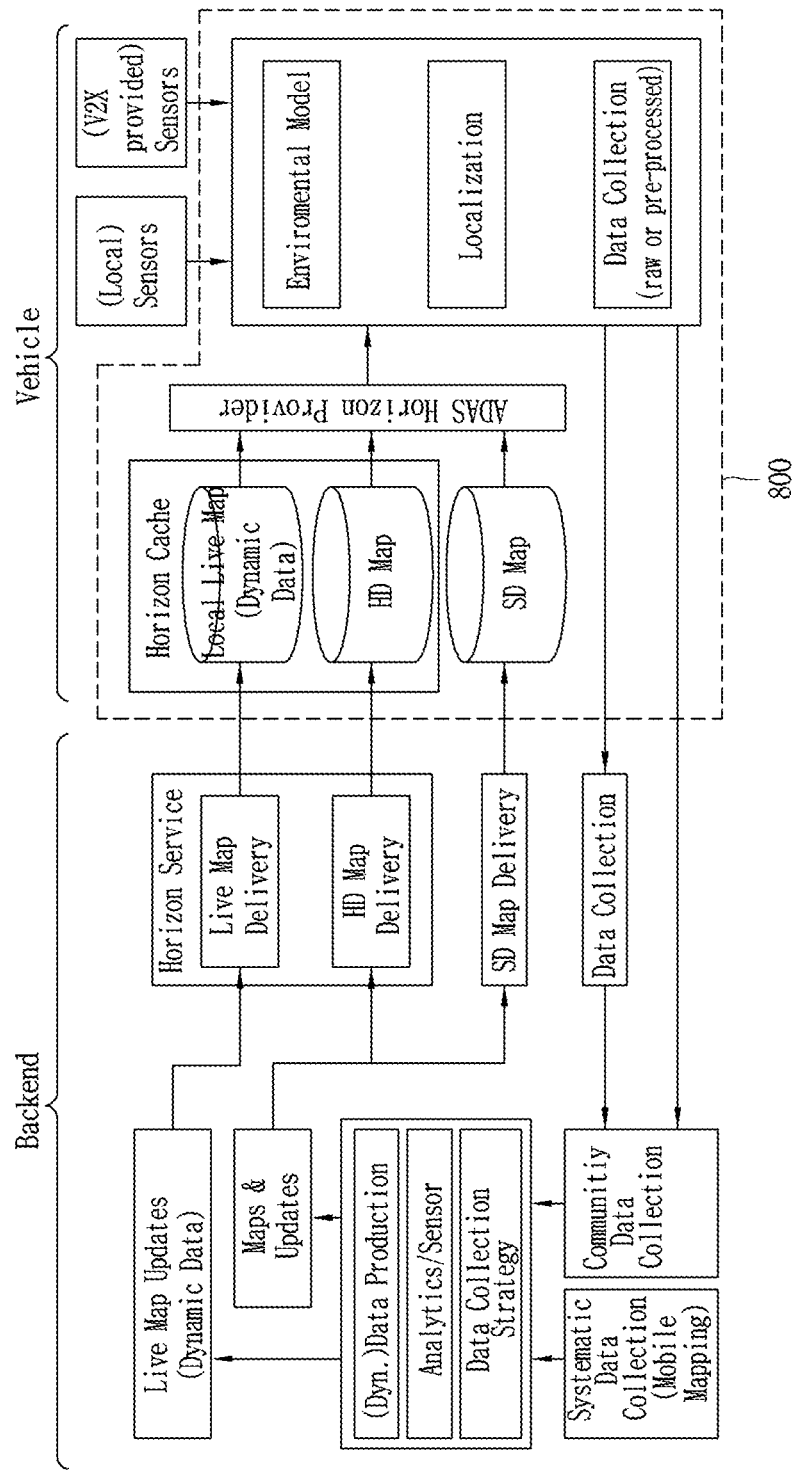
FIG. 12 is a block diagram illustrating an eHorizon system.

FIG. 12 is a block diagram illustrating an eHorizon system.

The eHorizon system includes a server (or backend) and a vehicle.

The server provides a map to the vehicle, and the vehicle controls various devices provided in the vehicle using the map.

The map providing device 800 receives one or more maps from the server using a memory (or Horizon Cache), and provides the received maps to electric components.

Further, the map providing device 800 collects electric component information received from the electric components and performs positioning (or localization) using the collected electric component information.

Positioning refers to specifying a current position of the vehicle using various information. For example, by comparing information included in the map received from the server with the electric component information, one matching point of those information may be specified as the current position of the vehicle.

The vehicle executes autonomous driving using the map provided by the map providing device 800 or executes various functions related to the autonomous driving. Therefore, the up-to-date state and accuracy of maps must be guaranteed for safety of passengers on board the vehicle.

To this end, the map providing device 800 transmits electric component information generated by the electric components to the server, and the server updates the map using the information transmitted from the map providing device 800.

The server manages the information received from the map providing device as big data, and adds new information to the map or edits or deletes existing information using the big data.

In the case of generating unreliable electric component information due to a failure of the electric component or various other reasons, there are a problem in positioning, and a problem in providing wrong information to all vehicles using the map due to the server updating the map using the wrong information.

If it is determined by a sensor, which is capable of acquiring surrounding environment information (an operation of a windshield wiper, a fog lamp, external weather information, a sensor capable of detecting a degree of moisture in the windshield, etc.), that an object detection capability of the camera in the vehicle is deteriorated, camera information should not be transferred to other electric components and should not be forwarded to the server to prevent update with wrong information.

For example, if a signboard captured by the camera in a heavy rain situation is used as electric component information, positioning may be made to a wrong position. If wrongly-captured signboard information is updated to the server, other vehicles may also use the wrong signboard information.

On the other hand, information updated from the map providing device to the server is processed as big data, and thereby real-time information cannot be reflected. In a state in which it is determined that information received from the server is not real time information, information received from the server should not be transmitted to the electric components and thus information detected by the camera should be used.

For example, in a situation where debris generated due to a car accident lies on a road and a lane change is required, information generated by the camera should be used instead of information received from the server.

When the information included in the map is inconsistent with the information generated by the electric component (or the information sensed by the sensor), the vehicle uses incorrect information, which causes a problem in stability of autonomous driving. Furthermore, since incorrect information is updated to the server, there is also a problem that unnecessary update occurs.

It is an object of the present invention to provide a map providing device 800 that can ensure the latest and accurate map while solving the above-mentioned problems.

Figure 13:
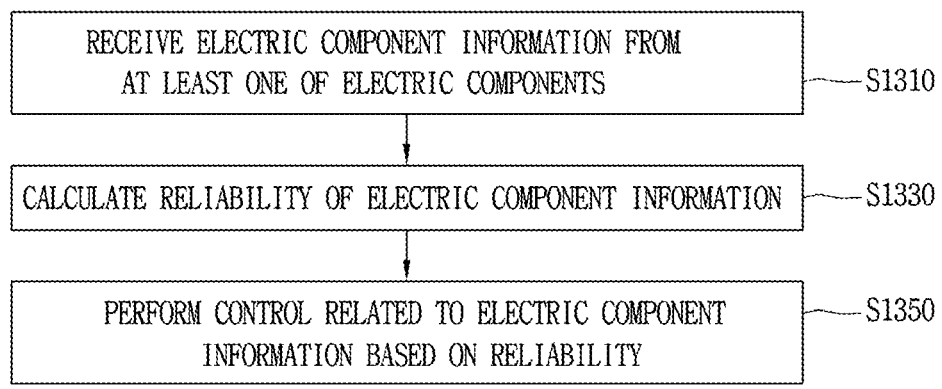
FIG. 13 is a flowchart illustrating an operation of a map providing device.

FIG. 13 is a flowchart illustrating an operation of a map providing device.

The present invention relates to a map providing device 800 mounted on a vehicle 100 to provide map data to a plurality of electric components provided in the vehicle 100.

An electric component is defined as any device that is provided in the vehicle 100 to perform communication with the map providing device 800 in a wired or wireless manner, and uses electricity as a power source. For example, each component described in FIG. 7 may correspond to the electric component.

The map providing device 800 includes the communication unit 810 and the processor 870.

The communication unit 810 is configured to perform communication with the electric components and receive an original map including a plurality of layers from the server. The communication unit 810 may perform communication with at least one of the electric components in a wired or wireless manner, and use a controller area network (CAN).

The original map may include one or more maps, and each map may be provided with a plurality of layers. For example, the original map may include the LDM and the ADAS MAP described above with reference to FIGS. 10A and 10B. Furthermore, the original map may further include a highly detailed map (HD map) and a standard detailed map (SD map).

The processor 870 receives electric component information from at least one of the electric components through the communication unit 810 (S1310).

The map providing device 800 receives the electric component information generated by the electric components through the communication unit 810. The electric component information may include an operation of a wiper or a lamp, weather information such as humidity/temperature, local object information searched by a LiDAR/radar/camera using image data, and the like.

The electric component information refers to information transmitted by the electric component, and the respective electric components may transmit different types of electric component information. For example, the wiper may send wiper information to indicate whether the wiper is on/off, and at what speed the wiper is operating if it is on. For another example, the electric components may include an image sensor such as a camera/LiDAR/radar, and the electric component information may include sensing information sensed by the image sensor. The sensing information may include an image generated by the image sensor, and one or more local objects searched from the image.

Next, the processor 870 calculates reliability of the electric component information (S1330).

The map providing device 800 receives the latest map from the server. However, the most up-to-date information is electric equipment information directly detected by each of various electric components provided in the vehicle. Therefore, an electric control unit (ECU) provided in the vehicle must simultaneously use external information, such as the map received from the server, and internal information, such as the electric component information generated by the electric components provided in the vehicle.

The processor 870 calculates reliability of the electric component information using information received through the communication unit 810. The processor 870 may use both the external information received from the server and the internal information received from the electric components provided in the vehicle, as variables for calculating the reliability of the electric component information.

For example, the wiper may be operating at a speed faster than a reference value. The reference value may refer to a speed of a motor for wiping off the rain in a situation where it is raining too heavy to use an image captured by the image sensor. The processor 870 may determine that image sensor information received from the image sensor is unreliable when it is checked from the wiper information received from the wiper that the wiper is operating at a speed faster than the reference value.

As another example, weather information indicating that a current temperature is 43° C. may be received from the server. If a reliable operation interval of the LiDAR is in the range of −10° C. to 39° C., the processor 870 may determine that LiDAR information received from the LiDAR is unreliable.

In addition, through various algorithms and equations, the processor 870 can calculate the reliability of the electric component information of each electric component and overall reliability of all the electric component information received through the communication unit 810 for a predetermined time. For example, when first electric component information is received from a first electric component and second electric component information is received from a second electric component, the processor 870 may calculate first reliability of the first electric component information and second reliability of the second electric component in different manners. In addition, overall reliability of the first and second electric component information may be calculated.

The predetermined time is preset but may vary depending on an amount of information received through the communication unit 810. For example, the predetermined time may be shortened when a large amount of information is received, and may extend when a small amount of information is received. This is to constantly maintain the time required to calculate the reliability and allow an execution of a control associated with the electric component information on time.

The predetermined time may also vary depending on a speed of the vehicle 100 or a location of the vehicle 100. This is to maintain an appropriate response time required for autonomous driving according to an autonomous driving situation. For example, the predetermined time may be shortened if the speed of the vehicle 100 is fast, and may extend if the speed is slow. For example, the predetermined time may be shortened when the vehicle 100 is located in an urban area with a large volume of traffic, and may extend when the vehicle 100 is located in an outer area having a small volume of traffic.

The processor 870 may calculate reliability of the original map as well as reliability of the electric component information by comparing the original map and the electric component information with each other.

For example, for a road on which the vehicle 100 is traveling, the image sensor may provide electric component information informing two lanes as a search result, while the original map may define eight lanes. In this case, reliability of the image sensor may be calculated to be higher, and reliability of the original map may be calculated to be lower.

Next, the processor 870 may perform a control related to electric component information based on the reliabilities.

In one example, the processor 870 may determine based on the reliabilities whether or not to generate a processed map using the electric component information. In generating the processed map, the processor 870 may exclude electric component information having reliability lower than a processing criterion and include electric component information having reliability higher than or equal to the processing criterion.

The processor 870 may determine whether or not to transmit electric component information to the server based on reliability. For example, the processor 870 may exclude electric component information, which has reliability lower than an update criterion, from the update. On the other hand, the processor 870 may update electric component information which has reliability higher than or equal to the update criterion.

In filtering or updating electric component information, a different criterion may be applied to each electric component providing electric component information.

Hereinafter, an example of generating a processed map as one embodiment of a control related to electric equipment information based on reliability will be described.

Figure 14:
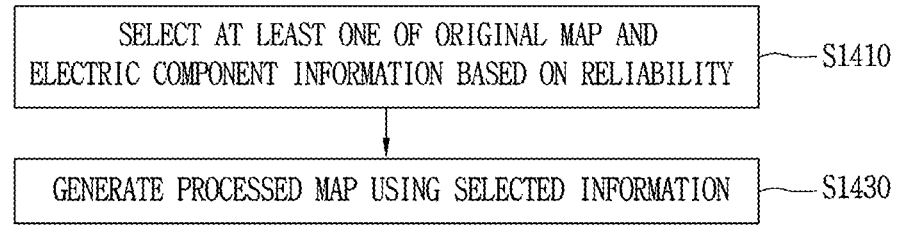
FIG. 14 is a flowchart illustrating one embodiment of a control related to electric component information.

FIG. 14 is a flowchart illustrating one embodiment of a control related to electric component information.

The processor 870 may generate a processed map from the original map using electric component information when reliability meets a preset condition. The processor 870 provides an original map or a processed map to electric components disposed in the vehicle 100. The processor 870 may decide electric component information to be included in the processed map, which is to be transmitted to the electric components, on the basis of the reliability.

Specifically, the processor 870 selects at least one of an original map and electric component information based on reliability (S1410).

For example, an external information criterion for the original map and an internal information criterion for the electric component information may be preset. If reliability of the original map is higher than the external information criterion, the original map is selected. However, if reliability of the original map is lower than or equal to the external information criterion, the original map is not selected. If reliability of the electric component information is higher than the internal information criterion, the electric component information is selected. However, if reliability of the electric component information is lower than or equal to the internal information criterion, the electric component information is not selected.

In another example, the processor 870 may compare reliability of the original map with reliability of the electric component information, and may select either the original map or the electric component information. In this case, the original map or the electric component information is selected.

Next, a processed map may be generated using the selected information (S1430).

The information which has not been selected by the processor of the original map and the electric component information is not included in the processed map.

When the electric component information is selected and the original map is not selected, only the electric component information is transmitted to the electric components without providing the original map. At this time, the vehicle 100 may perform autonomous driving purely using only internal information generated in the vehicle without utilizing the map received from the server.

When only the original map is selected and the electric component information is not selected, the vehicle 100 does not use the electric component information even when the electric component information is directly received from the electric component.

The processor 870 may select at least one of the plurality of layers included in the original map based on the electric component information. In this case, one or more layers of the plurality of layers not selected by the processor are excluded from the processed map.

For example, a third layer of the original map includes traffic light information but electric component information indicating that the traffic light included in the third layer has disappeared may be received from the image sensor. In this case, it may be determined that reliability of the third layer is lower than the external information criterion, and the third layer may be excluded from the processed map.

On the other hand, the original map may include a plurality of dynamic objects to be sensed by at least one electric component. In the aforementioned embodiment, the traffic light corresponds to an example of the dynamic object.

The processor 870 may select at least one of the plurality of dynamic objects included in the original map based on electric component information. One or more dynamic objects which have not been selected by the processor among the plurality of dynamic objects are excluded from the processed map. In the aforementioned example, the entire third layer is not excluded from the processed map but a specific dynamic object which corresponds to the traffic light may be deleted from the processed map.

On the other hand, electric component information may include a plurality of electric component information received from different electric components. For example, the electric component information may include first electric component information received from a first electric component and second electric component information received from a second electric component.

The processor 870 may calculate first reliability of the first electric component information and second reliability of the second electric component information, and give different weights to the first electric component information and the second electric component information by considering the first reliability and the second reliability in generating the processed map.

For example, in the original map, location information of a predetermined object may be provided as (x1, y1, z1), the LiDAR may provide first electric component information in which the location information of the predetermined object is sensed as (x2, y2, z2), and the radar may provide second electric component information in which the location information of the predetermined object is sensed as (x3, y3, z3). At this time, the processor 870 may specify the location of the predetermined object by using the original map, and the first and second electric component information, and give different weights to the first electric component information and the second electric component information, respectively, based on first reliability of the first electric component information and second reliability of the second electric component information. Thus, more reliable location information can be provided.

The processed map is provided to the electric components through the communication unit 810, and the electric components perform their own operations using the provided processed map.

Figure 15:
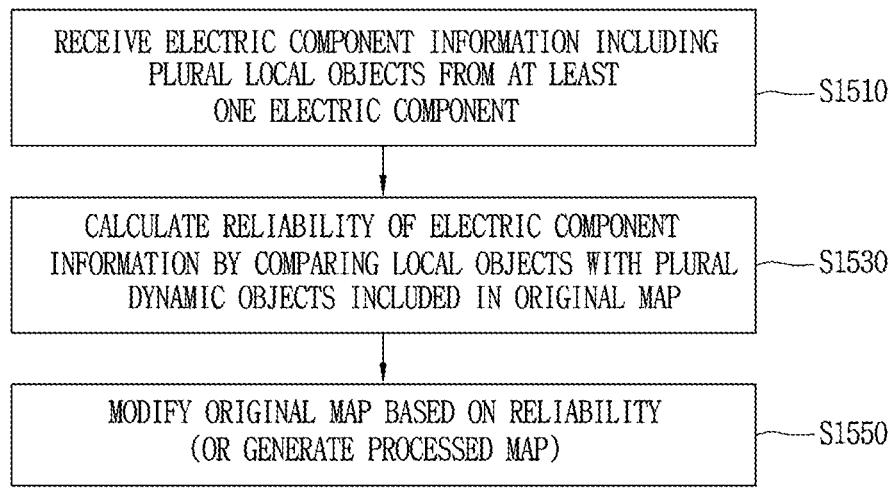
FIG. 15 is a flowchart illustrating a method of calculating reliability of electric component information.

FIG. 15 is a flowchart illustrating a method of calculating reliability of electric component information.

The processor 870 receives electric component information including a plurality of local objects from at least one electric component (S1510).

A dynamic object is made to be sensed by at least one electric component and included in the original map. On the other hand, the local object is sensed by an image sensor. For example, a speed limit sign may be set as a local object, and location information of the speed limit sign may be included. The image sensor may sense the speed limit sign as a local object, and generate the sensed location information as electric component information.

Reliability of the electric component information is calculated by comparing the local objects with the plurality of dynamic objects included in the original map (S1530).

The original map is modified (or the processed map is generated) based on the reliability (S1550).

The processor 870 modifies (edits) the original map using the local objects when the reliability of the electric component information satisfies a preset condition.

For example, at least one of a reference point and a reference axis of the original map may be moved using the local objects.

In another example, the processor 870 may classify the dynamic objects into a first group including dynamic objects matching the local objects and a second group including dynamic objects not matching the local objects, in order to generate a more accurate processed map. If the reliability satisfies the preset condition, the dynamic objects included in the second group may be modified. That is, instead of changing the reference point or the reference axis, location information set in a specific dynamic object may be changed.

Figure 16:
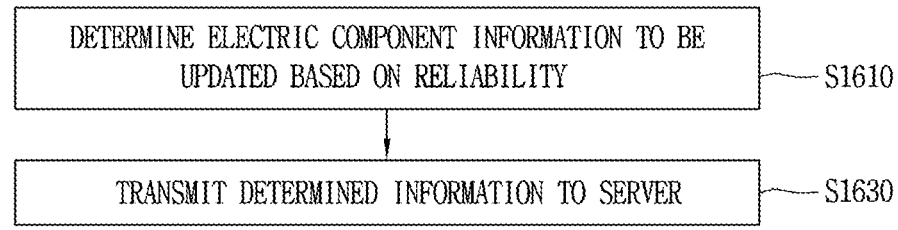
FIG. 16 is a flowchart illustrating one embodiment of a control related to electric component information.

FIG. 16 is a flowchart illustrating one embodiment of a control related to electric component information.

The processor 870 may determine whether or not to transmit electric component information to the server based on reliability of the electric component information.

The processor 870 controls the communication unit 810 to transmit the electric component information to the server when the reliability of the electric component information is higher than reliability of the original map. On the contrary, when the reliability of the electric component information is higher than the reliability of the original map, the processor 870 controls the communication unit 810 so that the original map is not transmitted to the electric components.

The processor 870 may determine electric component information to be updated based on reliability of the electric component information (S1610), and transmit the determined information to the server (S1630).

For example, when first reliability of first electric component information satisfies a reference condition and second reliability of second electric component information does not satisfy the reference condition, the processor 870 may select the first electric component information and transmit only the selected first electric component information to the server.

When there are one or more local objects that do not match the dynamic objects among the local objects included in the electric component information, the processor 870 may control the communication unit 810 such that local object information related to the one or more local objects can be transmitted to the server.

Further, when there are the one or more local objects that do not match the dynamic objects among the local objects, the processor 870 may also control the communication unit 810 to transmit the local object information to other vehicles. In this case, since the transmission to the other vehicles is made through the V2X communication, the local object information can be transferred more directly.

The local object information may include an image in which the one or more local objects are captured, and location information for guiding the one or more local objects.

Since only information with reliability guaranteed is selectively updated to the server, new effects can be provided that the computation of the server can be reduced, and only necessary information can be updated.

Figure 17:
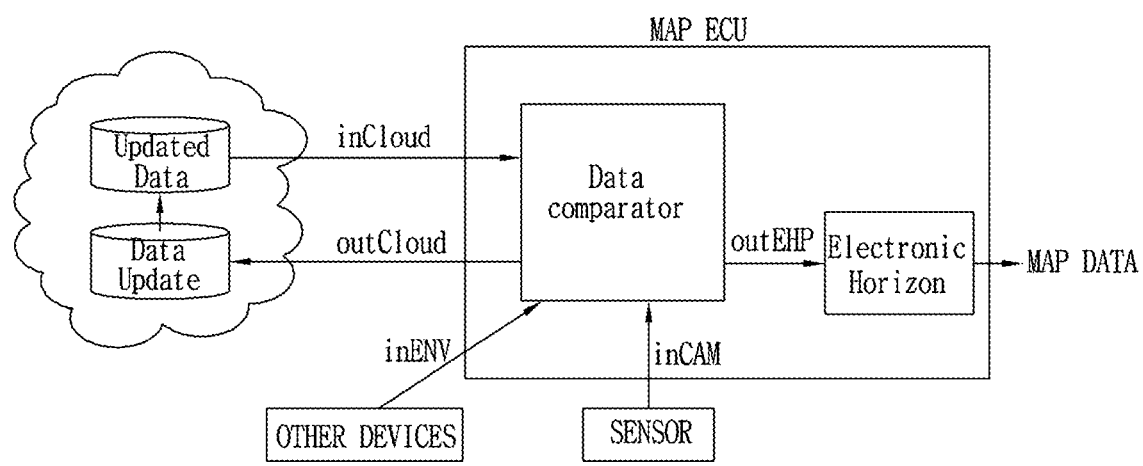
FIG. 17 is a block diagram illustrating in more detail a map providing device according to the present invention.
Figure 18:
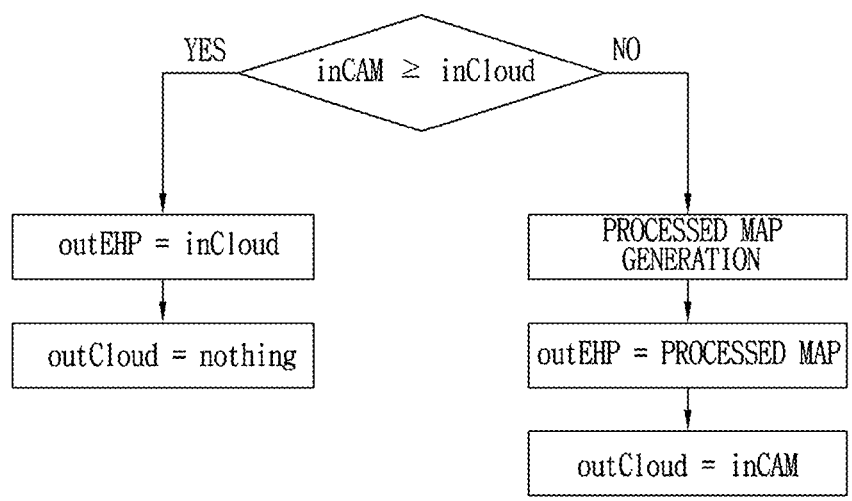
FIG. 18 is a flowchart illustrating an operation of the map providing device of FIG. 17.

FIG. 17 is a block diagram illustrating in more detail a map providing device according to the present invention, and FIG. 18 is a flowchart illustrating an operation of the map providing device of FIG. 17.

The map providing device 800 according to the present invention may receive an original map inCloud from the server and receive electric component information inCAM, inENV from a sensor or other devices.

The map providing device 800 may further include a data comparator that plays the role of the processor 870 described above with reference to FIGS. 13 to 16. The data comparator may generate map data outEHP to be transmitted to electric components, and decide internal data outCloud to be transmitted to the server.

Referring to FIG. 18, when reliability of the original map inCould received from the server is higher than or equal to reliability of the electric component information inCAM received from the sensor, the data comparator provides the original map to the electrical components and does not transmit the electric component information to the server.

On the other hand, when the reliability of the original map inCould received from the server is lower than the reliability of the electric component information inCAM received from the sensor, a processed map is generated. The processed map is provided to the electric components instead of the original map, and the electric component information inCAM is transmitted to the server.

Figure 19:
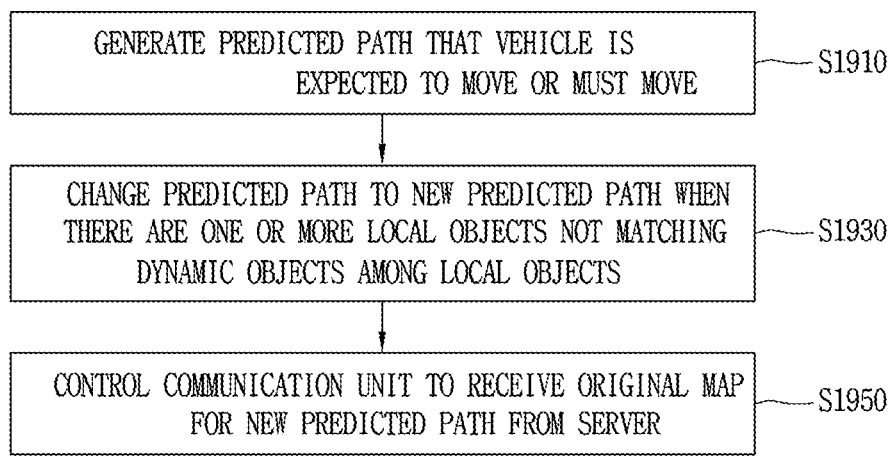
FIG. 19 is a flowchart illustrating one embodiment of a control related to electric component information.

FIG. 19 is a flowchart illustrating one embodiment of a control related to electric component information.

The processor 870 of the map providing device 800 generates a predicted path in which the vehicle 100 is expected to move or must move (S1810). The processor 870 extracts a part of the original map based on the predicted path and provides the extracted part to the electric components, other than providing the entire original map received from the server to the electric components. This is to reduce the computation of the electronic components and to use a cache effectively.

When there are one or more local objects that do not match dynamic objects among the local objects included in the electric component information, the processor 870 changes the predicted path to a new predicted path (S1830). Then, the processor 870 controls the communication unit 810 to receive the original map of the new predicted path from the server (S1850).

This is to enable safer driving because there is a problem in reliability of the original map.

On the other hand, the original map managed by the server needs to immediately reflect real-time information that occurs on roads. Since information transmitted by a plurality of vehicles is processed as big data and cannot be reflected immediately, there is a need for a process of performing an immediate update with respect to necessary information.

More specifically, the map providing device may have an emergency update condition preset to perform an immediate update. When electric component information received from at least one of the electric components corresponds to the emergency update condition, the processor 870 performs an emergency update with respect to the electric component information. The server immediately updates the received information by the emergency update and reflects it on the map. Vehicles arriving in a corresponding area may receive the map updated through the emergency update, which may result in securing safety of the plurality of vehicles.

The emergency update condition, for example, may include when a mismatch between a lane provided by the original map and a lane sensed by an image sensor or the like exceeds a reference value, when there is an object whose collision possibility exceeds a reference value although it is not existent in the original map, and when a vehicle designated as an emergency update such as an emergency car or a police car is detected within a predetermined range based on the vehicle 100.

The present invention can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. An apparatus that is mounted in a vehicle and that is configured to provide map data to a plurality of electric components disposed in the vehicle, the apparatus comprising:
at least one communication interface that is configured to communicate with the plurality of electric components, and that is configured to receive, from a server, an original map that includes a plurality of layers; and
a processor that is configured to:
receive electric component information from at least one of the electric components;
calculate a reliability of the electric component information based on the electric component information and the original map; and
perform an operation based on the calculated reliability of the electric component information,
wherein the processor is configured to:
determine whether or not to transmit the electric component information to the server based on the calculated reliability of the electric component information;
control the at least one communication interface to cause the electric component information to be transmitted to the server based on a determination that the calculated reliability of the electric component information is higher than reliability of the original map, and
based on a determination that first reliability of first electric component information satisfies a reference condition and second reliability of second electric component information does not satisfy the reference condition, transmit, to the server, only the first electric component information that satisfies the reference condition.

2. The apparatus of claim 1, wherein the processor is configured to:
use the electric component information to generate a processed map from the original map based on a determination that the calculated reliability satisfies a preset condition; and
control the at least one communication interface to provide the processed map to the plurality of electric components.

3. The apparatus of claim 2, wherein the processor is configured to:
select at least one of the original map or the electric component information based on the calculated reliability; and
generate the processed map based on the selection.

4. The apparatus of claim 3, wherein information not selected by the processor of the original map or the electric component information is not included in the processed map.

5. The apparatus of claim 3, wherein the processor is configured to:
select at least one of the plurality of layers included in the original map based on the electric component information,
wherein one or more layers of the plurality of layers not selected by the processor are excluded from the processed map.

6. The apparatus of claim 3, wherein the original map includes a plurality of dynamic objects to be sensed by at least one electric component,
wherein the processor is configured to select at least one of the plurality of dynamic objects included in the original map based on the electric component information, and
wherein one or more dynamic objects not selected by the processor among the plurality of dynamic objects are excluded from the processed map.

7. The apparatus of claim 1, wherein the electric component information includes first electric component information that is received from a first electric component, and second electric component information that is received from a second electric component, and
wherein the processor is configured to calculate first reliability of the first electric component information, and second reliability of the second electric component information, and is configured to give different weights that are used in generating the processed map to the first electric component information and the second electric component information, respectively, in consideration of the first reliability and the second reliability.

8. The apparatus of claim 1, wherein the original map includes a plurality of dynamic objects to be sensed by at least one electric component,
wherein the electric component information includes a plurality of local objects sensed by at least one electric component, and
wherein the processor is configured to calculate the reliability based on the dynamic objects and the local objects.

9. The apparatus of claim 8, wherein the processor is configured to use the local objects to modify the original map based on a determination that the calculated reliability satisfies a preset condition.

10. The apparatus of claim 9, wherein the processor is configured to move at least one of a reference point or a reference axis of the original map based on the local objects.

11. The apparatus of claim 9, wherein the processor is configured to:
classify the dynamic objects into a first group that includes dynamic objects that match the local objects, and a second group that includes dynamic objects that are different from the local objects; and modify the dynamic objects included in the second group based on a determination that the calculated reliability satisfies the preset condition.

12. The apparatus of claim 8, wherein the processor is configured to control the at least one communication interface to transmit local object information related to one or more local objects to the server based on a determination that the one or more local objects are different from the dynamic objects included in the local objects.

13. The apparatus of claim 12, wherein the processor is configured to control the at least one communication interface to transmit the local object information to another vehicle based on a determination that the one or more local objects that are different from the dynamic objects included in the local objects.

14. The apparatus of claim 12, wherein the local object information includes an image with the one or more local objects captured in the image, and includes location information that guides the one or more local objects.

15. The apparatus of claim 12, wherein the processor is configured to generate a predicted path that the vehicle is predicted to move; and change the predicted path to a new predicted path based on a determination that the one or more local objects that are different from the dynamic objects included in the local objects.

16. The apparatus of claim 15, wherein the processor is configured to control the at least one communication interface to receive an original map for the new predicted path from the server based on the predicted path being changed to the new predicted path.

17. The apparatus of claim 1, wherein the processor is configured to determine to forego transmission of the original map to be to the electric components based on a determination that the calculated reliability of the electric component information is higher than the calculated reliability of the original map.

18. The apparatus of claim 1, wherein the plurality of electric components include an image sensor, and the electric component information includes sensing information that is sensed by the image sensor.

* * * * *